Feb. 22, 1927.

H. B. BURT

ICE CREAM SUCKER

Filed Feb. 6, 1924

1,618,324

INVENTOR.
H. B. Burt
BY
ATTORNEYS

Patented Feb. 22, 1927.

1,618,324

UNITED STATES PATENT OFFICE.

HARRY B. BURT, OF YOUNGSTOWN, OHIO; CORA W. BURT AND THE DOLLAR SAVINGS AND TRUST COMPANY, EXECUTORS OF SAID HARRY B. BURT, DECEASED, ASSIGNORS TO CORA W. BURT.

ICE-CREAM SUCKER.

Original application filed January 30, 1922, Serial No. 532,810. Divided and this application filed February 6, 1924. Serial No. 691,064.

The present invention relates to a frozen confection and has for its object to provide an ice cream sucker which has a heart or core of hard candy or the like which can be consumed in the usual manner after the frozen body portion of ice cream, sherbet or the like has been eaten.

The subject matter of this application has been divided out of a co-pending application for a frozen confection which was filed by me on January 30, 1922, Serial No. 532,810, and among the objects of the invention is to provide a frozen confection which has novel means associated therewith for handling the same, whereby it can be both handled and eaten without the necessity of touching it with the fingers and without any need for a spoon or dish. To this end a head of hard candy or like edible material which is hard at normal temperatures is applied to the end of a stick, and a frozen mass of edible substance such as ice cream or sherbet which is fluid at normal temperatures is applied to the candy head, so as to surround the same and be supported by the candy head and stick.

The confection can then be supported and handled by means of a stick, and this is important from a hygienic and sanitary standpoint, since it is not necessary for the confection to be touched by the human hand either during the manufacture thereof or while being handled by the dealer or eaten by the consumer.

For a full understanding of the new frozen confection reference is to be had to the following description and accompanying drawings, in which, Fig. 1 is a side elevation of a frozen confection embodying the invention, parts being broken away and shown in section.

Figure 1:
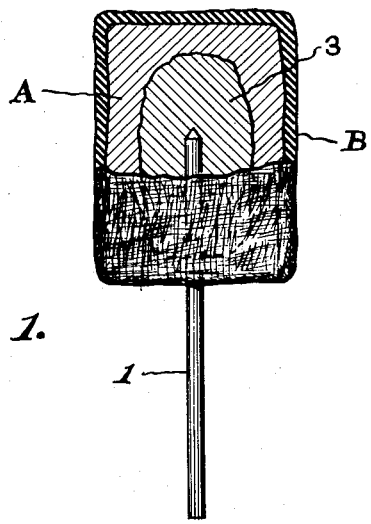
Figure 2:
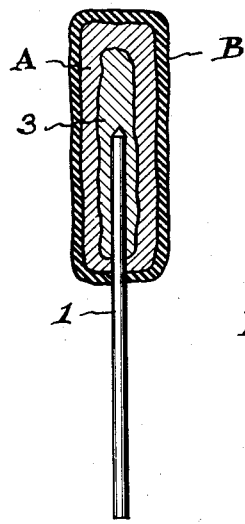
Fig. 2 is a transverse sectional view on the line 2—2 of Fig. 1.
Figure 3:
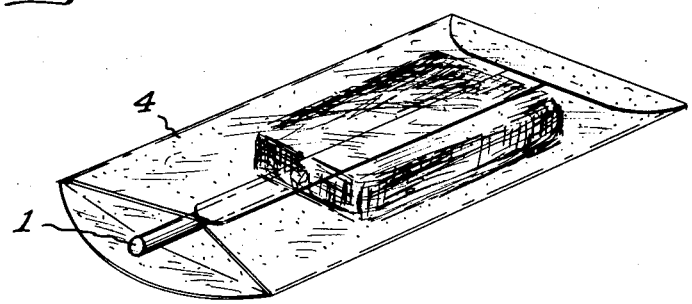
Fig. 3 is a perspective view showing the confection as enclosed in an appropriate wrapper.

Referring to the drawings, the reference character A designates the body portion of the frozen confection, said body portion being composed of some edible material such as ice cream, sherbet, ices or the like, which is soft or fluid at normal temperatures and becomes hardened when subjected to refrigeration and frozen. If desired, the body portion A may be provided with an edible coating or shell B which envelops and practically hermetically seals the body portion. The edible shell may be composed of any suitable material, such as chocolate, which is relatively hard at normal temperatures and will provide a non-sticky covering.

The frozen body portion A surrounds a heart or core 3 of some edible substance such as hard candy which is hard at normal temperatures and can be readily applied to the end of a stick 1.

In a preferred form of the invention the stick 1 and candy head 3 constitute the well known candy sucker, of which large quantities are sold by every confectioner. The body portion A of frozen edible material, which is soft or fluid at normal temperatures, may be applied to the head 3 in any suitable manner. The result can be accomplished in a very effective way by inserting the candy head 3 of the sucker in the body portion A while the latter is in a partially frozen condition and still soft, the candy head being held in position until the freezing has been completed, whereupon the candy member 3 is firmly embedded in the heart of the then frozen and hardened body portion A, and attached thereto by congelation.

In making these ice cream suckers the apparatus disclosed in my U. S. Patent No. 1,470,525, which was granted on October 9, 1923, may be used to advantage, and the process disclosed in my U. S. Patent No. 1,470,525, granted October 9, 1923, may also be used.

The head 3 of hard candy provides a heart or core for the support of the ice cream, and the ice cream comes into engagement with the candy over a comparatively large area, so that the ice cream is supported in a most effective manner. The usual rough outer surface of the head 3 may also be of assistance in obtaining a firm bond or union between the ice cream and the candy.

After the edible outer coating or shell B has been applied and given an opportunity to become chilled or hardened the confection may, if desired, be placed in a suitable wrapper, such as the semi-transparent waxed or glazed paper envelope indicated at 4. The chocolate outer shell B prevents the ice cream or frozen body portion from sticking to the wrapper or bag and enables the confection to be handled and eaten without any stickiness or muss.

The stick 1 provides a means for handling the confection while it is being made and while it is being sold and eaten, so that it never becomes necessary for the confection to be touched by a human hand, and from a sanitary viewpoint this is a factor of considerable importance, since it is a well recognized fact that food products which are subjected to handling frequently become menaces to the health.

The confection comprises a frozen body portion A of some edible substance such as ice cream, sherbet or the like which is soft or liquid at normal temperatures, said frozen body portion having an edible core of a substance which is hard at normal temperatures and which is fixed to a stick so that the frozen body portion can be readily supported by the stick while it is being eaten. If desired, the frozen body portion may be enveloped in an outer shell B of some edible substance such as chocolate, which is hard and non-sticky at normal temperatures. The confection is held in the hand by means of the stick 1, while the body portion A of ice cream or like material is eaten and after the ice cream has been consumed the candy sucker remains and can be eaten in the usual manner. The purchaser of the confection will thus obtain a generous portion of ice cream or like material which is mounted upon a stick so that it can be handled and eaten without being touched by the fingers or using a spoon or plate, and after the ice cream has been eaten a candy sucker remains for consumption in the usual manner.

It may be mentioned that the function of the outer shell or cover B is not to sustain the frozen body A in shape, since if it is properly prepared and frozen this is not necessary, but rather to provide a non-sticky covering so that the confection can be handled and eaten like any other candy and at the same time to provide a pleasant flavoring for the ice cream or other material of the frozen body portion A.

The hard candy from which the head 3 is made is of a soluble character and becomes sticky when moistened. When the candy head first becomes embedded in the ice cream it is probable that a thin film of the ice cream surrounding the candy will be initially melted, thereby causing the surface of the hard candy to become sticky and perhaps dissolving a portion of the hard candy therein. This film of melted ice cream with the candy dissolved therein will be subsequently frozen with the result that the body of ice cream will be firmly attached to the candy head by congelation. The rough surface of the hard candy will also assist in causing the ice cream to adhere thereto.

Having thus described my invention what I claim as new and desire to secure by Letters Patent is—

1. A confectionery product including a stick, an edible head applied to the stick and formed of material which is hard and adheres to the stick at normal temperatures, and a frozen mass of an edible substance which is fluid at normal temperatures surrounding the head so as to be supported by the head and stick while being eaten.

2. A confectionery product including a stick, a hard candy head applied to the stick, and a frozen mass of an edible substance which is fluid at normal temperatures surrounding the hard candy head so as to be supported by the head and stick while being eaten.

3. A frozen confectionery product including a stick, an edible head applied to the stick and formed of material which is hard and adheres to the stick at normal temperatures, a frozen mass of an edible substance which is fluid at normal temperatures surrounding the head so as to be supported by the head and stick while being eaten, and an outer envelope of edible material which is hard and non-sticky at normal temperatures applied to the frozen mass of edible substance.

4. A frozen confectionery product including a stick, a head applied to the stick and formed of an edible and soluble substance which is hard at normal temperatures, and a frozen mass of an edible substance which is fluid at normal temperatures surrounding the head and attached thereto by the congelation of a film of the fluid in which a portion of the hard substance has been dissolved.

5. A frozen confectionery product including a stick, a head applied to the stick and formed of an edible substance which is hard at normal temperatures and has a sticky surface when subjected to moisture, and a frozen mass of an edible substance which is fluid at normal temperatures surrounding the head and attached thereto by congelation so as to be supported by the head and stick.

6. A frozen confectionery product including a stick, a head of hard candy applied to one end of the stick, the candy of the head being hard at normal temperatures and of a soluble character and a frozen mass of edible substance which is fluid at normal temperatures surrounding the hard candy head, a film of the fluid substance which is adjacent to the head having portions of the hard candy dissolved therein, the frozen substance being supported by the stick and hard candy head while being eaten.

In testimony whereof I affix my signature.

HARRY B. BURT.